(12) United States Patent
Simoes et al.

(10) Patent No.: US 7,554,285 B2
(45) Date of Patent: *Jun. 30, 2009

(54) PORTABLE BATTERY CHARGER

(75) Inventors: Felipe Oliveira Simoes, Kitchener (CA); Dan G. Radut, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,036

(22) Filed: Jul. 31, 2007

(65) Prior Publication Data

US 2008/0036418 A1    Feb. 14, 2008

Related U.S. Application Data

(63) Continuation of application No. 10/443,286, filed on May 22, 2003, now Pat. No. 7,268,519, which is a continuation of application No. 10/007,848, filed on Nov. 5, 2001, now Pat. No. 6,583,601.

(60) Provisional application No. 60/246,142, filed on Nov. 6, 2000.

(51) Int. Cl.
*H01M 10/46* (2006.01)
(52) U.S. Cl. ...................................... 320/103
(58) Field of Classification Search .............. 320/103, 320/106, 107, 110, 114, 115
See application file for complete search history.

(56) References Cited

U.S. PATENT DOCUMENTS

| 3,749,905 | A | * | 7/1973 | Friedman et al. ............ 362/183 |
| 3,775,659 | A | | 11/1973 | Carlsen, II |
| 4,433,251 | A | | 2/1984 | Banks et al. |
| 4,510,431 | A | | 4/1985 | Winkler |
| 4,692,680 | A | * | 9/1987 | Sherer ........................ 320/103 |
| 5,173,855 | A | | 12/1992 | Nielsen et al. |
| 5,229,649 | A | | 7/1993 | Nielsen et al. |
| 5,272,475 | A | | 12/1993 | Eaton et al. |
| 5,396,162 | A | * | 3/1995 | Brilmyer .................... 320/114 |
| 5,444,378 | A | | 8/1995 | Rogers |
| 5,568,038 | A | | 10/1996 | Tatsumi |
| 5,631,503 | A | | 5/1997 | Cioffi |
| 5,638,540 | A | | 6/1997 | Aldous |
| 5,651,057 | A | | 7/1997 | Blood et al. |
| 5,769,877 | A | | 6/1998 | Barreras, Sr. |
| 5,850,113 | A | | 12/1998 | Weimer et al. |
| 5,939,860 | A | | 8/1999 | William |
| 5,977,747 | A | * | 11/1999 | Huang ........................ 320/115 |
| 6,043,626 | A | * | 3/2000 | Snyder et al. ............... 320/113 |

(Continued)

OTHER PUBLICATIONS

Electric Double-Layer Capacitors, vol. 2, Oct. 25, 1996 (Japan, Tokin Corp., Cat. No. EC-200E).

(Continued)

*Primary Examiner*—Edward Tso
(74) *Attorney, Agent, or Firm*—Jones Day; Krishna K. Pathiyal; Robert C. Liang

(57) ABSTRACT

A handheld mobile communication device includes a rechargeable first battery for powering the device. A charger includes a second battery. The charger is configured to be detachably coupled to and supported by the device. The device and the charger can be carried together as a single unit as the charger charges the first battery with power from the second battery.

22 Claims, 4 Drawing Sheets

U.S. PATENT DOCUMENTS

| | | | |
|---|---|---|---|
| 6,049,192 | A | 4/2000 | Kfoury et al. |
| 6,104,162 | A | 8/2000 | Sainsbury et al. |
| 6,104,759 | A | 8/2000 | Carkner et al. |
| 6,184,654 | B1 * | 2/2001 | Bachner et al. ............. 320/114 |
| 6,583,601 | B2 | 6/2003 | Simoes et al. |

OTHER PUBLICATIONS

Supercapacitor: User's Manual, vol. 2 (Japan, Tokin Corp., date unknown).

Charging Big Supercaps, Portable Design, p. 26, Mar. 1997.

* cited by examiner

PORTABLE BATTERY CHARGER

CROSS-REFERENCE TO RELATED APPLICATIONS

This is a continuation of U.S. application Ser. No. 10/443,286, filed May 22, 2003, now U.S. Pat. No. 7,268,519 which is a continuation of U.S. application Ser. No. 10/007,848, filed Nov. 5, 2001 (now U.S. Pat. No. 6,583,601), which claims priority of U.S. Provisional Application No. 60/246,142, filed Nov. 6, 2000, all three applications hereby incorporated by reference.

TECHNICAL FIELD

This invention relates to battery chargers, especially for mobile communication devices.

BACKGROUND

Many electronic devices, such as mobile communication devices, are powered by rechargeable batteries. Typically, rechargeable batteries include Lithium-ion (LiIon) and Nickel Cadmium (NiCad) cells. Instead of powering down the device and replacing the rechargeable battery, these electronic devices are typically plugged into a battery charger when the rechargeable battery is in a low charge state. Battery chargers typically include a cord that plugs into an electrical wall outlet and the electronic device.

SUMMARY

A handheld mobile communication device includes a rechargeable first battery for powering the device. A charger includes a second battery. The charger is configured to be detachably coupled to and supported by the device. The device and the charger can be carried together as a single unit as the charger charges the first battery with power from the second battery.

Preferably, the charger monitors the first battery's voltage and change from a first charging mode to a second charging mode when the first battery's voltage exceeds a threshold. The charger discontinues charging the first battery when the second battery's voltage drops below a threshold. The charger sends a signal to the device indicative of the first battery's voltage being low. The device notifies a user that the first battery's voltage is low voltage. The device notifies a user that the charger has ceased charging the first battery when the charger has ceased charging the first battery. The charger charges the first battery with the power from the second battery at a voltage that is different than the second battery's voltage.

DESCRIPTION

Figure 1:
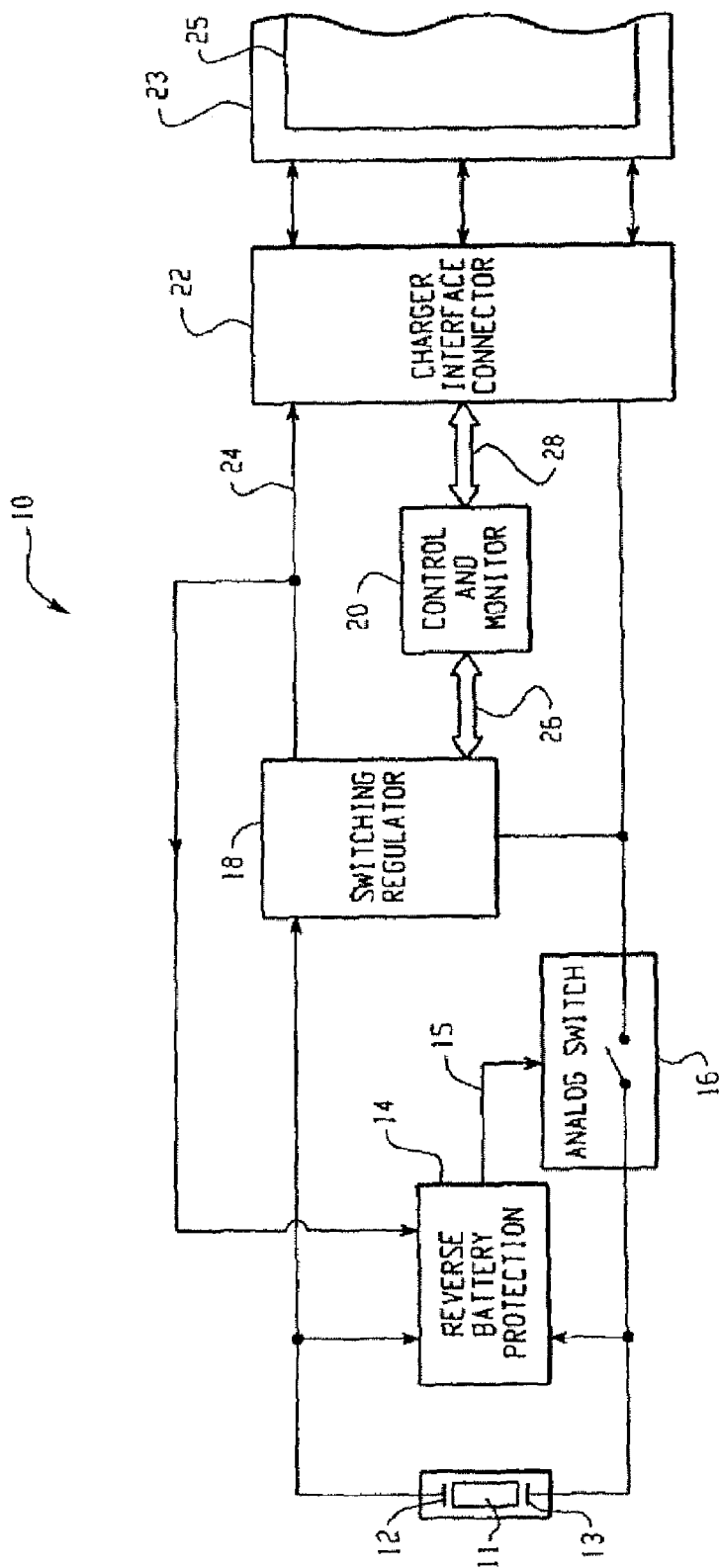
FIG. 1 is a block diagram of a portable charger circuit.

Referring now to the drawing figures, FIG. 1 is a block diagram of a portable charger circuit 10. The charger circuit 10 includes a low-voltage battery 11 and first and second battery contacts 12 and 13, which provide power to the charger circuit 10. A reverse battery protection module 14, an analog switch 16, a switching regulator 18, and a control and monitor module 20 operate together to transform the charge in the low voltage battery 11 into a charger output 24. A charger interface connector 22 communicates with a mobile device 23 having a rechargeable battery 25. The battery 11 inserted between the battery contacts 12 and 13 charges the rechargeable battery 25 (such as a LiIon cell battery) in the mobile device 23 through the charger interface connector 22.

The battery contacts 12 and 13 are coupled in parallel with the reverse battery protection module 14. In addition, one of the battery contacts 12 is also coupled to the switching regulator 18, and the other battery contact 13 is coupled both to the switching regulator 18 and the charger interface 22 through the analog switch 16. The analog switch 16 receives a control signal 15 from the reverse battery protection module 14 that can open the analog switch 16 in order to decouple the battery 11 from the charger circuit 10. The switching regulator 18 generates the charger output 24, which is fed back to the reverse battery protection module 14, and which is also coupled to the charger interface connector 22. The control and monitor module 20 communicates with the switching regulator 18 and the charger interface connector 22 through control signals 26 and 28. The charger interface connector 22 preferably communicates to the mobile device 23 through a serial connection, such as a 16-pin miniature connector.

Preferably, one of the battery contacts 12 is a positive terminal and the other battery contact 13 is a negative terminal. When a battery 11 is inserted between the battery contacts 12 and 13, the reverse battery protection module 14 detects whether the battery 11 is inserted correctly by checking the polarity of the battery 11. If the battery polarity is reversed, then the control signal 15 from the reverse battery protection module 14 opens the analog switch 16, thereby decoupling the negative terminal 13 from the switching regulator 18 and charger interface connector 22. The reverse battery protection module 14 thus protects the circuit 10 from reverse polarity that could occur if a battery 11 was inserted incorrectly. By maintaining the analog switch 16 in the off (open) position, the reverse battery protection module 14 prevents any charge from the battery 11 from leaking to the switching regulator 18, or to other components in the circuit 10.

The reverse battery protection module 14 also monitors the charge line to turn the analog switch 16 on in the presence of an operational rechargeable battery.

If the battery 11 is installed correctly between the contacts 12 and 13, then the switching regulator 18 is preferably powered from a low-voltage value battery 11 and provides power to the charger output 24, which is used to charge the rechargeable battery 25 in the mobile device 23. The switching regulator 18 preferably operates in one of two different modes depending on the voltage of the rechargeable battery 25 in the mobile device 23. When the rechargeable battery voltage is low, then the switching regulator 18 preferably operates in a current limiting mode. In this mode, the switching regulator 18 generates a constant current output 24 through the charger interface connector 22 to the mobile device 23. The rechargeable battery 25 is charged from this constant current output 24 until the rechargeable battery 25 reaches a threshold voltage, which depends on the LiIon battery voltage. Once the threshold voltage is reached, then the switching regulator 18 preferably switches to a constant voltage mode. In the constant voltage mode, the switching regulator 18 preferably generates a constant voltage output 24 to charge the rechargeable battery 25. As the rechargeable battery 25 voltage rises to its final charge value, that is, the rechargeable battery is fully charged, the feedback signal 28 from the mobile device 23 is used to regulate the output of the switching regulator 18 in order to keep the voltage constant at the rechargeable battery 25 terminals.

The differing modes for charging the rechargeable battery 25 are provided in order to achieve efficient recharging. When the charger circuit 10 is in the current limiting mode, the switching regulator 18 preferably generates a full duty cycle charger output 24. Thus, when the voltage of the rechargeable battery 25 is below the threshold level, the rechargeable battery 25 is charged on a full duty cycle. Once the threshold voltage is reached, however, the voltage of the battery 11 is no longer sufficient to charge the rechargeable battery 25, and the switching regulator 18 switches to a constant voltage mode to increase the voltage of the charger output 24. The control and monitor module 20 monitors the feedback signal 28 to determine the voltage of the rechargeable battery 25. As the rechargeable battery voltage exceeds the threshold voltage, the control and monitor module 20 controls the output voltage of the charger output 24. As the rechargeable battery voltage increases, the control and monitor module 20 increases the voltage of the charger output 24 in order to continue to charge the rechargeable battery 25.

The control and monitor module 20 monitors signals 26 and 28 from the switching regulator 18 and the mobile device to control the operation of the circuit 110 For example, the control and monitor module 20 may monitor the voltages of the charger battery 11 and the rechargeable battery 25, and control signals from the mobile device 25. The control and monitor module 20 monitors the charger battery 11 to determine when the voltage of the battery is below 1.0 V. When the voltage is below 1.0 V, the control and monitor module 20 sends a signal to the switching regulator 18 to shut it down in order to prevent damage to the switching regulator 18. The control and monitor module 20 may also send a signal to the mobile device 25 to report the low voltage to a user of the device so that the user can replace the charger battery 11. As described above, the control and monitor module 20 may also monitor the rechargeable battery voltage to determine when to switch modes on the switching regulator 18, and to turn off the switching regulator 18 when the rechargeable battery 25 reaches a desired voltage level.

The voltage of the rechargeable battery 25 is monitored by the control and monitor module 20 through the charger interface connector 22 as an analog feedback signal 28. The control and monitor module 20 monitors the feedback signal 28 to determine when to send a control signal 26 to the switching regulator 18 to change modes from current limiting to constant voltage. This signal is preferably sent to the switching regulator 18 when the feedback signal 28 is around the threshold value. The control and monitor module 20 then monitors the feedback signal 28 to ramp up the charger output 24 as the rechargeable battery 25 is charged to the final desired voltage level (fully charged). The switching regulator 18 thus produces an output signal 24 at a voltage that is higher than the voltage of the rechargeable battery 25. The charging continues until the rechargeable battery 25 is fully charged (around 4.1 V), or the charger battery voltage drops to 1.0 V. If the charger battery voltage drops to 1.0 V, then the control and monitor module 20 may send a signal to the mobile device 23, which can notify a user that the charger battery 11 is in a low voltage state, and charging has stopped. The control and monitor module 20 thus monitors the charge in both batteries to determine how to charge the rechargeable battery 25 from the charger battery 11.

For example, when a user determines that the rechargeable battery 25 in the mobile device 23 is in a low charge state, then the user connects the charging circuit 10 to the mobile device 25. The control and monitor module 20 detects the presence of the mobile device 25 and also detects the presence of the charger battery 11 in the charger circuit 10. The control and monitor module 20 then directs the switching regulator 18 to begin generating the charger output 24. Assuming the rechargeable battery 25 is in a charge state with a voltage below the final fully charged state, the control and monitor module 20 directs the switching regulator 18 to charge in current limiting mode. The control and monitor module 20 then monitors both batteries 11 and 25 for changes in their respective terminal voltages. When the rechargeable battery 25 is charged to a state where its voltage equals the final fully charged state, then the control and monitor module 20 switches the switching regulator 18 to the constant voltage mode. The control and monitor module 20 provides the voltage level of the rechargeable battery 25 to the switching regulator 18 so that the charger output 24 is regulated to keep the voltage constant at the rechargeable battery 25 terminals. The control and monitor module 20 then sends a shutdown signal to the switching regulator 18 when the voltage of the charger battery 11 is below 1.0 V, or the rechargeable battery 25 is fully charged. In an alternative embodiment, other control signals 28 from the mobile device 23 may also shut down the charging operation. For example, a temperature monitor on the mobile device 23 may generate a shutdown signal if the rechargeable battery 25 overheats during charging.

Figure 2:
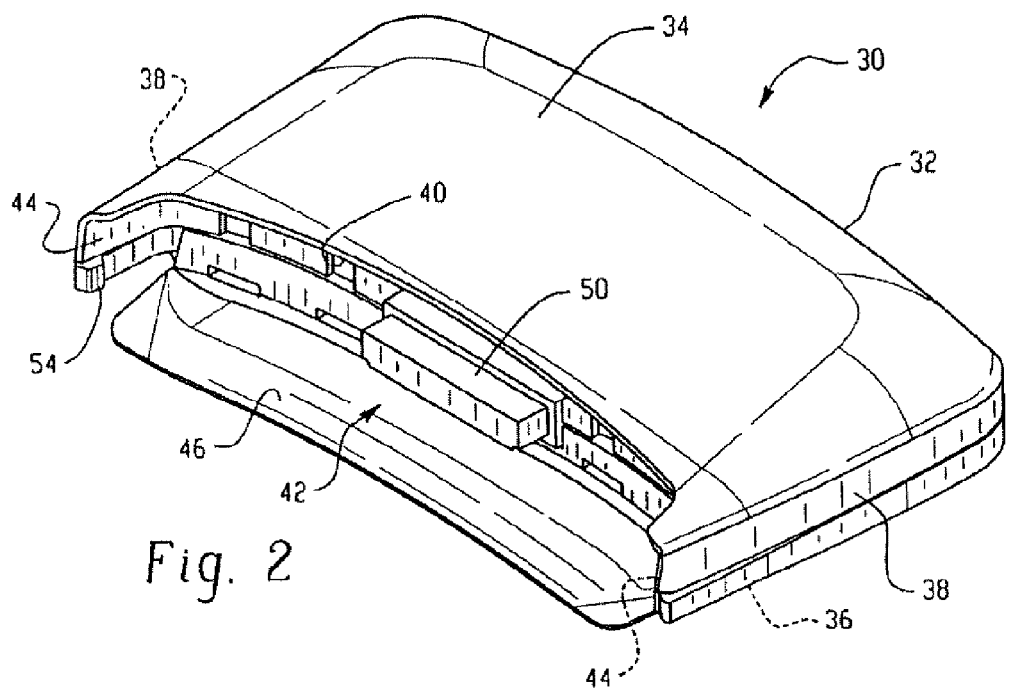
FIG. 2 is an orthogonal view of the front of a portable charger.
Figure 5:
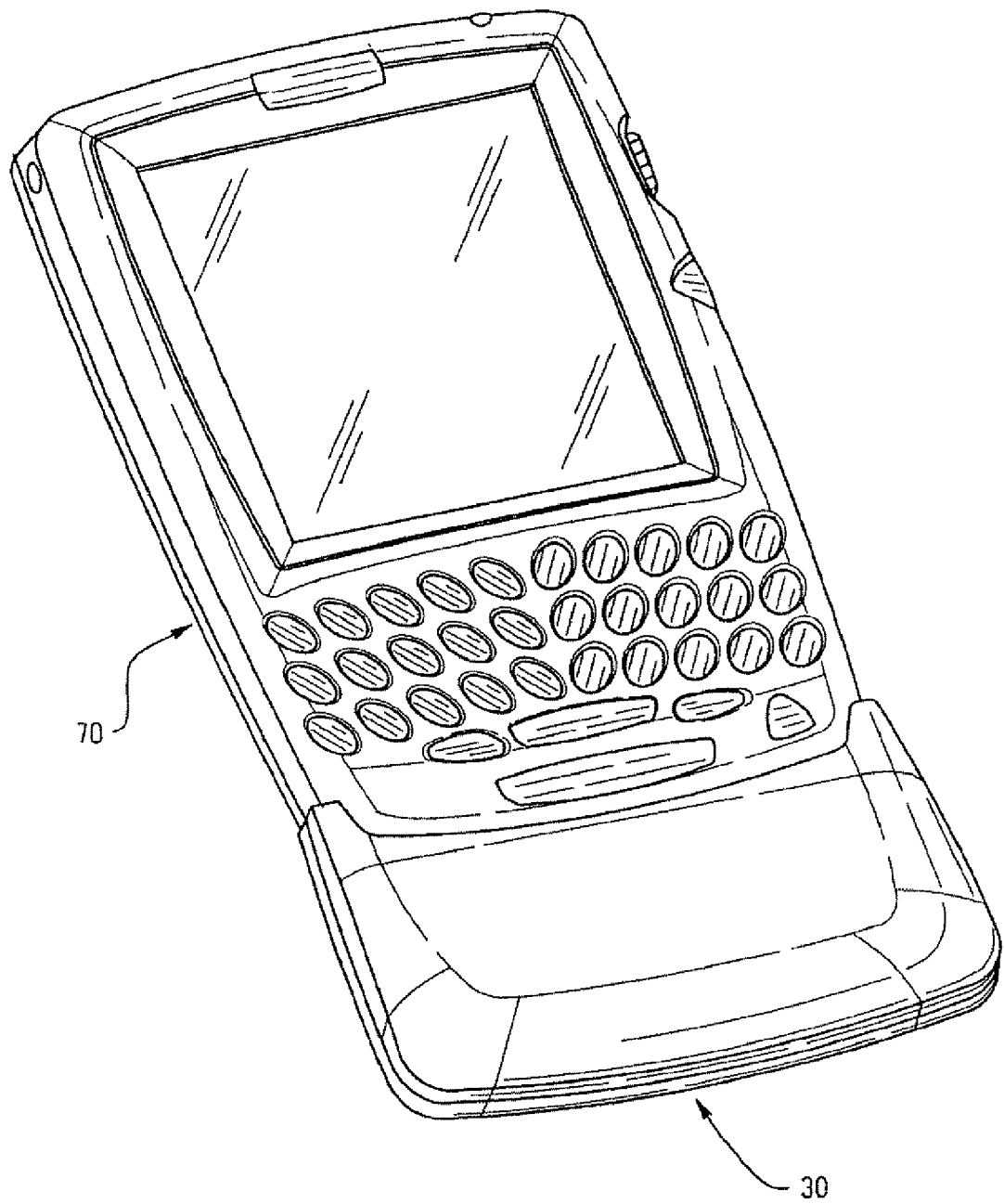
FIG. 5 is an orthogonal view of the portable charger connected to a portable electronic device.

FIG. 2 is an orthogonal view of the front of a portable battery charger 30. The battery charger 30 includes a generally rectangular housing 32. The housing includes a front wall 34, a back wall 36 and side walls 38. The back and side walls 36 and 38 extend past an edge 40 of the front wall 34 to form a well 42. The well 42 receives and mates with the mobile device 70 (FIG. 5). Side wall guides 44 guide the edges of the mobile device 70 into the well 30. An edge surface guide 46 of the back wall 36 guides the back of the mobile device 70 into the well 42. The guides 44 and 46 direct a pin connector on the mobile device 70 to mate with a connector 50 on the battery charger 30. The connector 50 may, for example, be the charger interface connector 22 described above with reference to FIG. 1. In this example, the connector 50 is a male pin connector, but other connectors on the battery charger 30 could instead include a female pin connector configured to mate with a male pin connector on the mobile device.

Prongs 54 engage the sides of the mobile device 23 so that the portable charger 30 is supported on the device through the prongs 54 instead of being supported through the pin connector 50. The prongs 54 preferably snap into notches in the side of the mobile device 70 such that an interference fit is achieved between the prongs 54 and the notches that can support the weight of the portable charger 26. The portable charger 30 can preferably be removed from the mobile device 70 by sliding the portable charger 30 away from the mobile device 70. The prongs 54 flex away from the sides of the mobile device 70 when the charger 30 is slid away from the mobile device 70.

Figure 3:
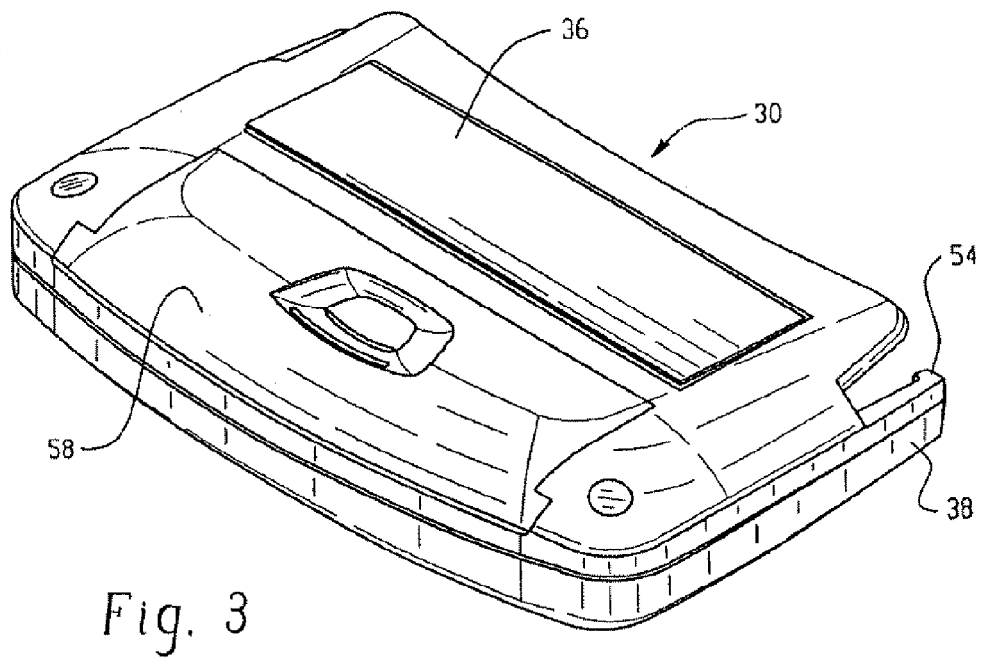
FIG. 3 is an orthogonal view of the back of the portable charger.
Figure 4A:
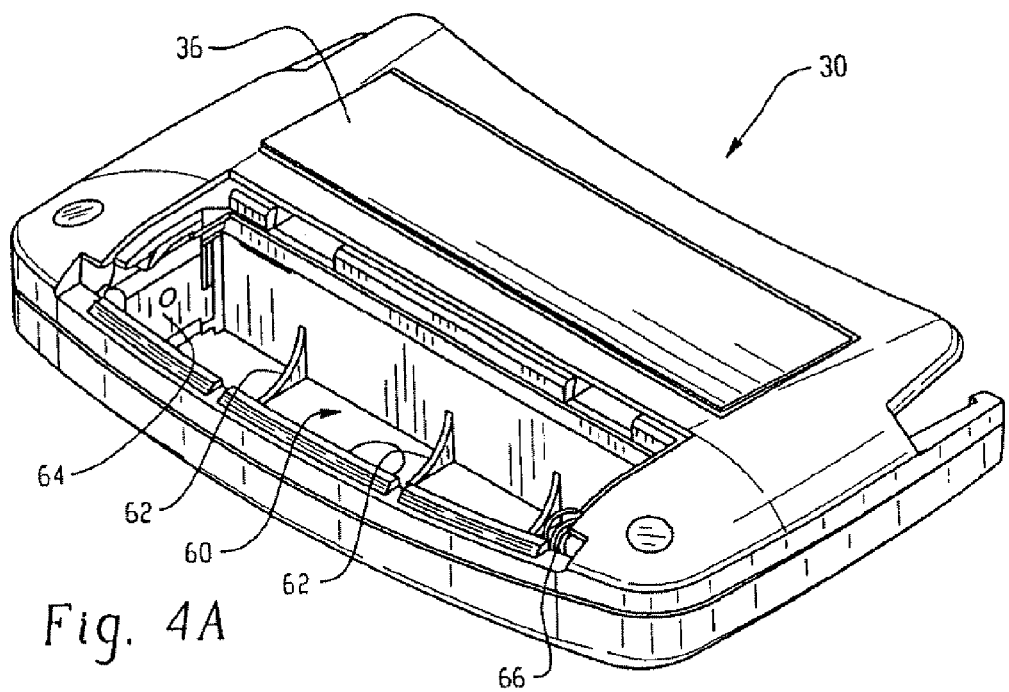
FIG. 4A is an orthogonal view of the back of the portable charger with a battery door cover removed.
Figure 4B:
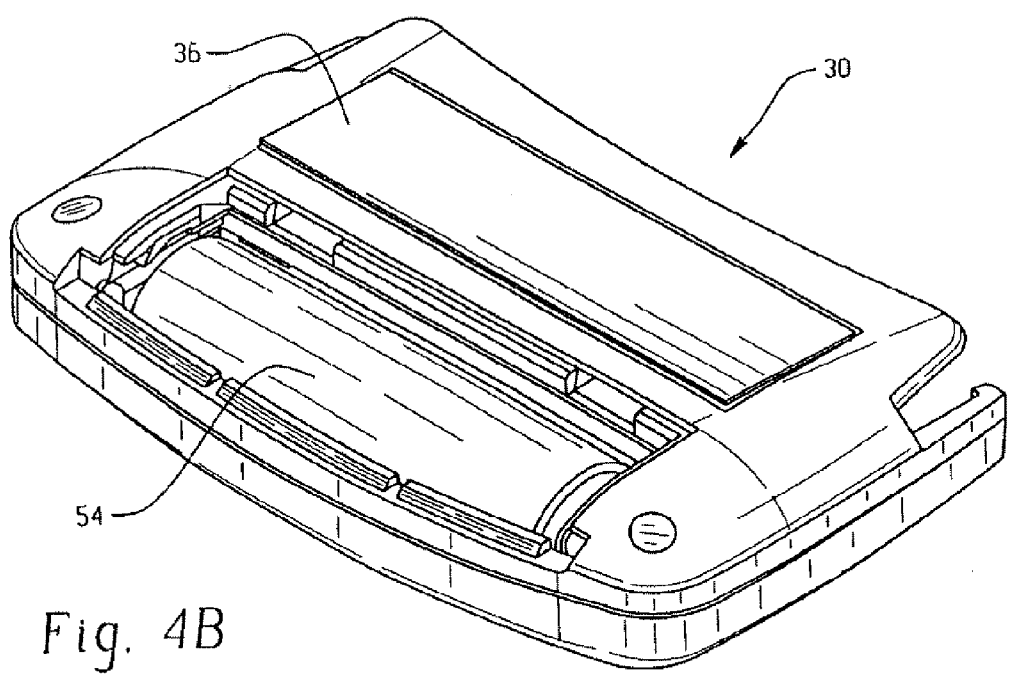
FIG. 4B is an orthogonal view similar to FIG. 4A with a battery installed.

FIG. 3 is an orthogonal view of the back of the portable battery charger 30. A battery cover 58 is slidably received on the back 36 of the portable charger 30. The battery cover 58 slides into place and is retained by an interference fit between the battery cover 58 and the back 36. FIG. 4A is an orthogonal view of the back of the portable charger 30 with the battery cover 58 removed. A battery compartment 60 includes battery guides 62, a positive contact 64, and a negative contact spring 66. The positive contact 64 and the negative contact spring 66 may, for example, be the battery contacts 12 and 13 described above with reference to FIG. 1. These components 62, 64, and 66 guide a battery so that the battery may be properly seated in the battery compartment 60. FIG. 4B is an orthogonal view of the back of the portable charger 30 with the battery door cover 50 removed, and a battery 68 inserted in the battery compartment 60.

FIG. 5 is an orthogonal view of the portable charger 30 connected to a portable electronic device 70. When attached to the mobile device 70, the portable charger 30 preferably extends from the base of the mobile device 70. A user can then carry both the portable charger 30 and the mobile device 70 so that the user may use the mobile device 70 as the portable charger 30 is charging the LiIon battery in the mobile device 70.

The embodiment described above is an example of structures or methods having elements corresponding to the elements recited in the claims. This written description may enable those skilled in the art to make and use embodiments having alternative elements that likewise correspond to the elements of the invention recited in the claims. The intended scope of the invention thus includes other structures or methods that do not differ from the literal language of the claims, and further includes other structures or methods with insubstantial differences from the literal language of the claims.

The invention claimed is:

1. An apparatus comprising:
a handheld mobile communication device that includes a rechargeable first battery for powering the device; and
a charger that includes a second battery and that is configured to be detachably coupled to and supported by the device, for the device and the charger to be carried together as a single unit as the charger charges the first battery with power from the second battery;
wherein the charger is configured to monitor the voltages of both the first and second batteries;
wherein the charger further comprises: a switching regulator coupled to the second battery for generating a charging output and a controller coupled to the first and second battery for controlling the operation of the switching regulator based on the measured voltage level of both the first and the second batteries.

2. The apparatus of claim 1 wherein the charger is configured to monitor the first battery's voltage and change from a first charging mode to a second charging mode when the first battery's voltage exceeds a threshold.

3. The apparatus of claim 2 wherein the first charging mode is a current limiting mode.

4. The apparatus of claim 2 wherein the second charging mode is a constant voltage mode.

5. The apparatus of claim 1 wherein the charger is configured to discontinue charging the first battery when the second battery'voltage drops below a threshold.

6. The apparatus of claim 1 wherein the charger is configured to send a signal, to the device, indicative of the first battery'voltage being low.

7. The apparatus of claim 1 wherein the device is configured to notify a user that the first battery's voltage is low voltage.

8. The apparatus of claim 1 wherein the device is configured to notify a user that the charger has ceased charging the first battery when the charger has ceased charging the first battery.

9. The apparatus of claim 1 wherein the charger is configured to charge the first battery with the power from the second battery at a voltage that is different than the second battery's voltage.

10. The apparatus of claim 1 wherein the device is configured to be used by a user while its first battery is being charged by the charger.

11. The apparatus of claim 1 wherein the charger include a housing, the housing having a well with side wall guides and an edge surface guide that slidably receive and mate the handheld mobile communication device to the charger.

12. An apparatus comprising:
a mobile communication device that includes a rechargeable first battery for powering the device; and
a charger including a second battery and a voltage converter that converts the second battery's voltage to an output voltage difrrent than the second battery's voltage, the charger configured to be detachably coupled to the device to charge the first battery with the output voltage;
wherein the charger is configured to monitor the voltages of both the first and second batteries;
wherein the charger further comprises: a switching regulator coupled to the second battery for generating a charging output and a controller coupled to the first and second battery for controlling the operation of the switching regulator based on the measured voltage level of both the first and the second battery.

13. The apparatus of claim 12 wherein the charger is configured to charge the first battery in a current limiting mode and in a constant voltage mode.

14. The apparatus of claim 13 wherein the charger is configured to operate in the current limiting mode when the first battery's voltage is below a threshold, and to automatically switch to operating in the constant voltage mode when the first battery's voltage exceeds the threshold.

15. The apparatus of claim 12 wherein the charger is configured to control its operation based on signals it receives from the device.

16. The apparatus of claim 15 wherein the signals indicate the first battery's voltage.

17. The apparatus of claim 15 wherein the signals indicate the first battery's temperature.

18. The apparatus of claim 12 wherein the charger is configured to cease charging the first battery in response to the second battery's voltage dropping below a threshold.

19. The apparatus of claim 11 wherein the housing further comprises fasteners that detachably fasten the charger to the handheld mobile communication device.

20. The apparatus of claim 19 wherein the fasteners are a pair of prongs located on the side wall guides.

21. The apparatus of claim 20 wherein the pair of prongs snap onto the handheld mobile communication device to provide an interference fit between the prongs and the handheld mobile communication device that supports the weight of the charger.

22. The apparatus of claim 21 wherein the pair of prongs snap onto a corresponding pair of notches on the handheld mobile communication device.

* * * * *

UNITED STATES PATENT AND TRADEMARK OFFICE
CERTIFICATE OF CORRECTION

PATENT NO. : 7,554,285 B2
APPLICATION NO. : 11/831036
DATED : June 30, 2009
INVENTOR(S) : Simoes et al.

It is certified that error appears in the above-identified patent and that said Letters Patent is hereby corrected as shown below:

Column 5, line 57, please change "battery'voltage" to -- battery's voltage --
    Column 5, line 60, please change "battery'voltage" to -- battery's voltage --
    Column 6, line 21, please change "difrrent" to -- different --

Signed and Sealed this

Fifth Day of January, 2010

David J. Kappos
*Director of the United States Patent and Trademark Office*